United States Patent
Wolf

(10) Patent No.: US 10,046,361 B2
(45) Date of Patent: Aug. 14, 2018

(54) PAINTING METHOD AND PAINTING INSTALLATION FOR PAINTING A COMPONENT WITH A CHARACTER EDGE

(71) Applicant: Durr Systems GmbH, Bietigheim-Bissingen (DE)

(72) Inventor: Udo Wolf, Lauffen (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/785,016

(22) PCT Filed: Apr. 7, 2014

(86) PCT No.: PCT/EP2014/000924
§ 371 (c)(1),
(2) Date: Oct. 16, 2015

(87) PCT Pub. No.: WO2014/169993
PCT Pub. Date: Oct. 23, 2014

(65) Prior Publication Data
US 2016/0082461 A1    Mar. 24, 2016

(30) Foreign Application Priority Data
Apr. 19, 2013   (DE) .......................... 10 2013 006 868

(51) Int. Cl.
*B05D 7/14* (2006.01)
*B05B 13/04* (2006.01)
(Continued)

(52) U.S. Cl.
CPC ............ *B05D 7/14* (2013.01); *B05B 13/0426* (2013.01); *B05B 13/0431* (2013.01);
(Continued)

(58) Field of Classification Search
CPC .............. B05B 13/0426; B05B 13/0457; B25J 11/0075
See application file for complete search history.

(56) References Cited

U.S. PATENT DOCUMENTS 4,539,932 A * 9/1985 Vecellio ................... B05B 5/04
118/622
5,175,018 A   12/1992 Lee et al.
(Continued)

FOREIGN PATENT DOCUMENTS

CN   1905952 A   1/2007
CN   102046300 A  5/2011
(Continued)

OTHER PUBLICATIONS

International Search Report and Written Opinion with Translation for PCT/EP2014/000924 dated Jul. 9, 2014 (15 pages).
(Continued)

*Primary Examiner* — Michael P Rodriguez
(74) *Attorney, Agent, or Firm* — Bejin Bieneman PLC

(57) ABSTRACT

A component is conveyed in a conveyor direction through a painting installation by conveyor. The component surface of the component to be painted is subdivided into surface painting modules which lie one behind the other in the conveyor direction. The individual painting modules of the component surface are painted one after the other using a multi-axis painting robot that has an atomizer.

Figure 1:
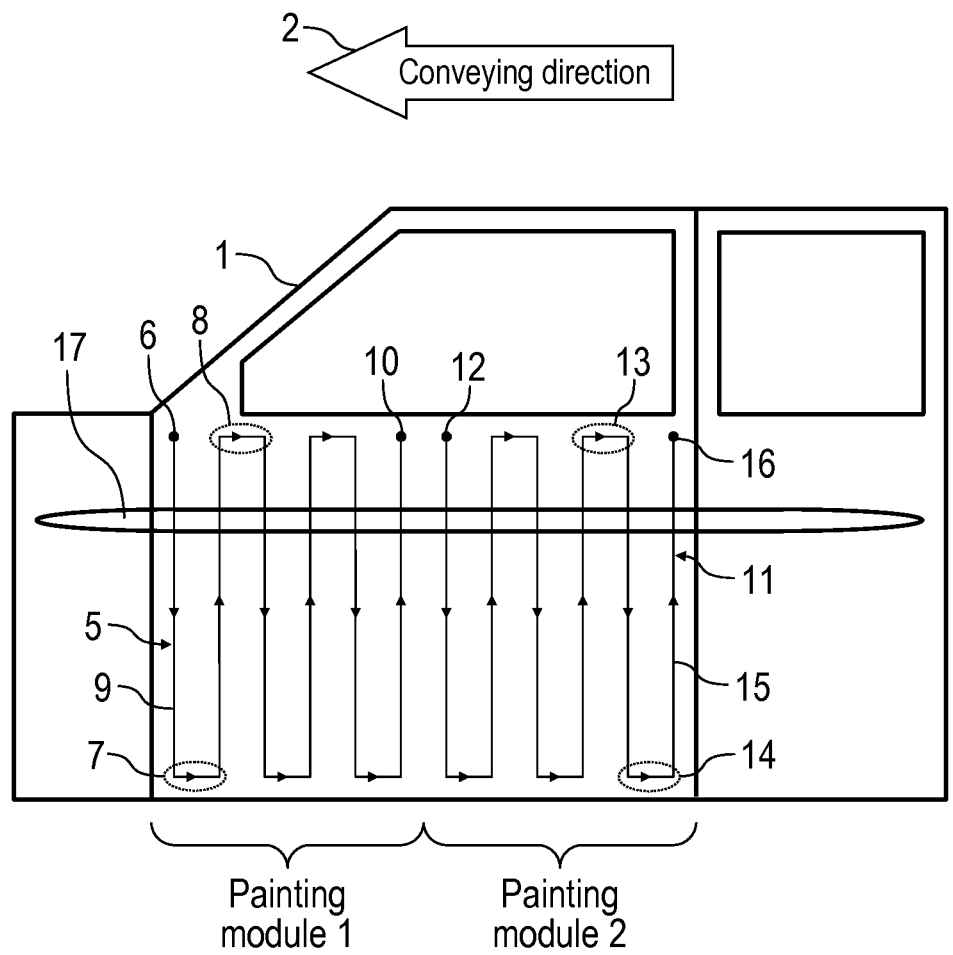

The painting robot guides the atomizer, within each one painting module, along a painting path and across the component surface of the painting module. The painting path has at least one path section running transverse to the component edge.

(Continued)

Within the painting module, the painting path can comprise at least one path section that runs substantially parallel to the component edge.

15 Claims, 6 Drawing Sheets

(51) Int. Cl.
  *B05D 1/02* (2006.01)
  *B25J 9/00* (2006.01)
  *B25J 11/00* (2006.01)
  *B05B 5/04* (2006.01)

(52) U.S. Cl.
  CPC ...... *B05B 13/0452* (2013.01); *B05B 13/0457* (2013.01); *B05D 1/02* (2013.01); *B25J 9/0093* (2013.01); *B25J 11/0075* (2013.01); *B05B 5/0407* (2013.01); *Y10S 901/14* (2013.01); *Y10S 901/43* (2013.01)

(56) References Cited

U.S. PATENT DOCUMENTS

| | | | |
|---|---|---|---|
| 5,372,856 A * | 12/1994 | Ogasawara | ......... B05B 13/0452 118/323 |
| 5,814,375 A | 9/1998 | Hissen | |
| 7,762,207 B2 | 7/2010 | Endregaard et al. | |
| 8,192,800 B2 | 6/2012 | Endregaard et al. | |
| 2007/0042123 A1 | 2/2007 | Endregaard et al. | |
| 2007/0134429 A1 | 6/2007 | Kenmoku | |
| 2007/0134430 A1 * | 6/2007 | Kenmoku | ........... B05B 13/0468 427/427.3 |
| 2009/0304940 A1 * | 12/2009 | Heldt | .................. B05B 13/0431 427/427.2 |
| 2010/0330292 A1 | 12/2010 | Endregaard et al. | |

FOREIGN PATENT DOCUMENTS

| | | |
|---|---|---|
| DE | 102009055850 A1 | 6/2011 |
| EP | 1733799 A1 | 12/2006 |
| EP | 1754544 A1 | 2/2007 |
| JP | H06262564 A | 9/1994 |
| JP | 2003144990 A | 5/2003 |
| WO | 9318860 A1 | 9/1993 |
| WO | 2009146936 A1 | 12/2009 |
| WO | 2011026698 A1 | 3/2011 |

OTHER PUBLICATIONS

Office Action and Search Report from the Chinese Intellectual Property Office for Application No. CN201480029005.5 dated Jan. 24, 2017 (with English translation; 10 pages).

* cited by examiner

PAINTING METHOD AND PAINTING INSTALLATION FOR PAINTING A COMPONENT WITH A CHARACTER EDGE

CROSS-REFERENCE TO RELATED APPLICATIONS

This application is a national stage of, and claims priority to, Patent Cooperation Treaty Patent Application No. PCT/EP2014/000924, filed Apr. 7, 2014, which claims priority to German Application No. DE 10 2013 006 868.1 filed on Apr. 19, 2013, each of which applications are hereby incorporated herein by reference in their entireties.

BACKGROUND

In modern painting installations for painting motor vehicle bodywork components, the motor vehicle bodywork components are conveyed by a conveyor through the painting installation and are then painted by one or more multi-axis painting robot(s) with atomiser(s) (e.g. rotary atomisers). In "six-axis tracking operation" (in the future, there may also be 7 axes present, but without the typical travel axis in the X-direction), a painting robot arranged to be locally fixed and having six movable axes is used, specifically with a rotatable robot axis, two pivotable robot arms and a robot hand axis with three movable axes. Herein, the surface of the motor vehicle bodywork component is subdivided into painting modules which are painted one after the other by the painting robot, wherein the painting modules are arranged one behind the other along the conveying direction of the conveyor. For example, one painting module can cover the front half of a motor vehicle door, whilst another painting module covers the rear half of the motor vehicle door. The painting robot begins by painting a painting module only when the conveyor has positioned the motor vehicle bodywork component relative to the painting robot such that the relevant painting module can be completely painted even in the case of a theoretically possible standstill of the conveyor. This means that the painting of a painting module is begun only when the relevant painting module lies entirely within the reach of the painting module. The length of the individual painting modules along the conveying direction is kept as short as possible in order not to have unnecessarily long waiting times before the painting of a painting module.

Figure 2:
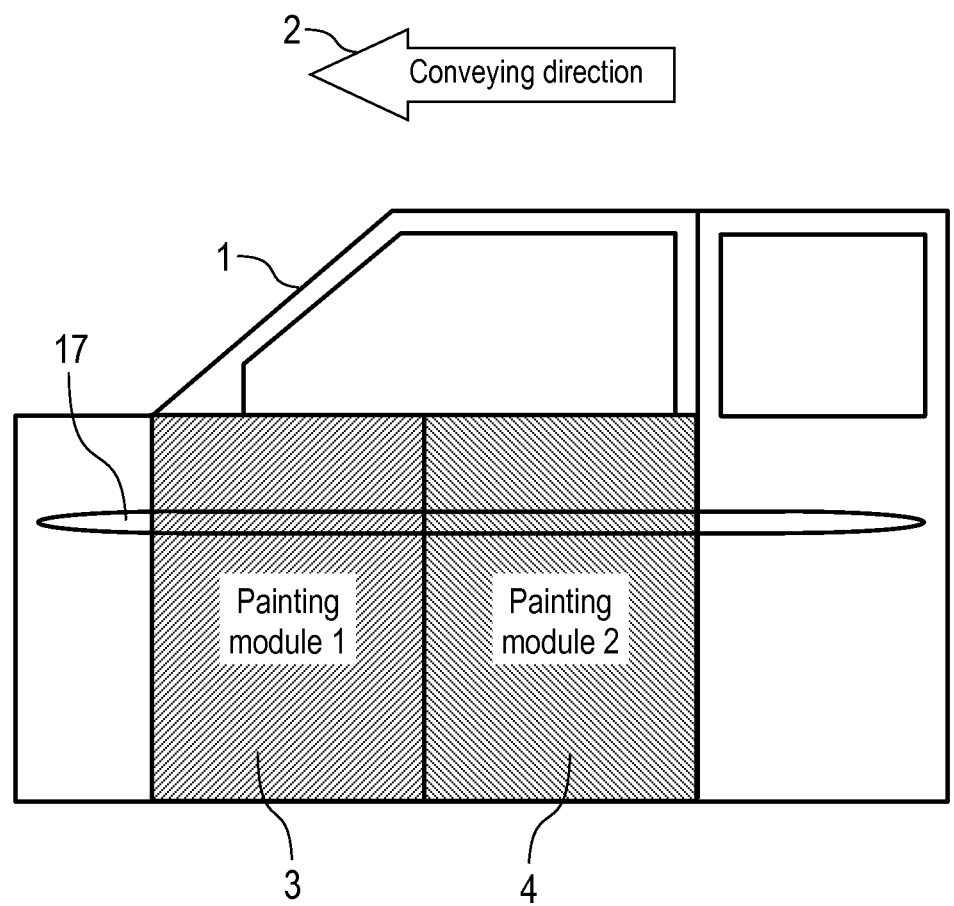

For this reason, conventionally, the individual painting modules are painted in the manner shown schematically in FIGS. 1 and 2. FIGS. 1 and 2 therefore show a portion of a side view of a motor vehicle bodywork component in the region of a motor vehicle door 1. During operation, the motor vehicle bodywork component is conveyed by a conventional conveyor (not shown) in a conveying direction through the painting installation, wherein the conveying direction is represented by an arrow 2.

The side surface of the motor vehicle door 1 is herein divided below the window into two painting modules 3, 4 (other subdivisions into painting modules are also possible, for example, given a larger surface than a door), which lie behind one another in the conveying direction and directly adjoin one another. Only when the motor vehicle bodywork component is transported through the painting installation by the conveyor, does the painting module 3 come within the range of the painting robot.

The painting robot then begins painting the painting module 3 in that the painting robot moves the rotary atomiser along a painting path 5 over the painting module 3, the painting path 5 beginning at a start point 6 and leading via a plurality of turning points 7, 8 and vertical path sections 9 to an end point 10.

The painting module 4 is then painted in the same way, wherein the painting robot guides the rotary atomiser along a painting path 11 starting from a start point 12, via a plurality of turning points 13, 14 and vertically extending path sections 15 to an end point 16.

In modern motor vehicle bodywork components, for aesthetic reasons, "character edges" 17 which extend substantially in the horizontal direction are often provided at the side flank of the motor vehicle bodywork. A problem arising during painting of motor vehicle bodywork components with such a character edge 17 is the fact that the vertical path sections 9, 15 always cross the character edge 17 substantially at right angles, which leads to an unsatisfactory painting result.

SUMMARY

A painting method is disclosed herein for painting a component with a component edge in a painting installation, in particular for painting a motor vehicle bodywork component with a "character edge", wherein a character edge of this type is described, for example, in DE 10 2009 055 850 A1. Also disclosed is a corresponding painting installation. A painting result can advantageously be optimised even when painting motor vehicle bodywork components with such a character edge.

The present disclosure is based on the technical and physical principle that the above-mentioned conventional painting method leads, during painting of a character edge, to an unsatisfactory painting result because the painting path crosses the character edge transversely to the character edge, because the risk of paint runs is particularly great therein. Thus, painted sites in the region of a character edge of this type react with running-off of the paint material, even on slight changes to the properties of the paint material used or minor changes to the climatic conditions in the paint booth, and this leads to an unacceptable painting result.

The present disclosure therefore includes the general technical teaching that the painting path has at least one path section within a painting module which extends substantially parallel to the component edge in order to avoid or at least minimise the troublesome crossing of the character edge by the painting path.

The painting method firstly provides, in accordance with the prior art, that the component to be painted (e.g. motor vehicle bodywork component, add-on part, etc.) is conveyed through a painting installation along a conveying direction by means of a conveyor. Herein, the conveyor can be configured in the conventional manner and can optionally convey the components in stop-start operation or in continuous conveying operation through the painting installation.

Furthermore, the painting method provides, in accordance with the prior art mentioned above, that the component surface to be painted of the component is subdivided into areal painting modules, wherein the painting modules lie one behind another along the conveying direction. For the painting of a motor vehicle door, for example, the front half of the motor vehicle door can form one painting module, whilst the rear half of the motor vehicle door constitutes another painting module.

The individual painting modules of the component surface are then painted one after the other by means of a multi-axis painting robot with an atomiser in that the painting robot guides the atomiser, in each case, within a painting module along a painting path over the component surface of the painting module. The painting path has at least one path section which extends transversely to the component edge, which is required in order that the whole painting module can be painted.

The disclosed subject matter differs from the prior art described in the introductory part in that the painting path has, within the painting module, at least one path section which extends essentially parallel to the component edge (e.g. character edge). In this context, it should be mentioned that the path section extending parallel to the component edge extends within the painting module, i.e., spaced apart from the turning points of the painting path. In this way, the present painting method differs from the known painting method described in the introductory part in which, although path sections parallel to the component edge also exist, said portions are arranged only at the turning points. In contrast thereto, with the present method, the path section extending parallel to the component edge extends within the painting module, i.e. spaced apart from the turning points.

In the present context, a conventional multi-axis painting robot, as marketed, for example, by the applicant, can be used.

Furthermore, in the present context, different atomiser types can be used, such as rotary atomisers, air atomisers, Airmix atomisers or ultrasonic atomisers. The present disclosure is therefore not restricted, with regard to the atomiser type used, to rotary atomisers, although in an exemplary embodiment, rotary atomisers are used.

The concept of a component edge is not restricted to a character edge extending laterally on the vehicle flank in the longitudinal direction of the vehicle. Rather, the concept of a component edge herein also covers other design elements or construction elements extending in the longitudinal direction of the vehicle that are elongate, for example, a bead, a fold edge or Power Domes on the engine hood. Furthermore, the expression "component edge" may also cover a "catwalk" and a "tornado line", i.e., an edge extending below the lateral shoulder of the bodywork over the entire vehicle length and generated by a plane offset which, in the extent thereof encompasses the bodywork, creates a visual connection and provides a dynamic impression.

The concept of a component edge should be distinguished, however, from the upper edge or the lower edge of a painting module. In an example, the component edge is therefore spaced apart from the upper and lower side edges of the painting module and therefore extends within the painting module.

It should also be mentioned regarding the component edge that the component edge preferably extends horizontally and/or substantially parallel to the conveying direction. However, it is also possible that the component edge is slightly inclined, which is often preferred in motor vehicle bodywork, for aesthetic reasons.

It has already been mentioned above that it is problematic if the painting path crosses the component edge, because this can result in "runs". However, it is hardly possible entirely to prevent such crossing of the component edge by the painting path. It is, however, preferably provided that the painting path crosses the component edge within the painting module (i.e., spaced apart from the side edges) less than four times, three times or even less than twice.

Furthermore, it has already been mentioned above that, in the present painting method, the painting path has at least one path section which extends parallel to the component edge. Preferably, this path section extends not only parallel adjacent to the component edge, but exactly along the component edge, so that the atomiser paints the component edge while covering this path section.

It is also possible, however, that the painting path has path sections which extend parallel to the component edge, wherein said parallel path sections extend partially along the component edge and partially adjacent to the component edge.

In order to optimise the painting result, the possibility exists that, during painting, the atomiser and/or the painting robot is operated with different parameter sets ("brushes"). For example, when painting the path sections extending parallel to the component edge, another parameter set can be used than when painting the path sections which extend transversely to the component edge.

The possibility also exists that, when painting on the path sections extending parallel adjacent to the component edge, a different parameter set is used than when painting on the path sections which extend exactly along the component edge.

The possibility also exists that the parameter set for the atomiser and/or for the painting robot is dynamically adjusted within a path section in order to optimise the painting result.

The concept of a "brush" parameter set for controlling the atomiser and/or the painting robot, can comprise, for example, the following operating parameters of the atomiser or the painting robot:
rotational speed of the rotary atomiser,
shaping air flow which is output by the atomiser in order to form the spray jet of the atomiser,
paint flow, i.e. paint volume flow or paint mass flow,
high voltage potential of an electrostatic paint charge, with which the applied paint is electrostatically charged,
travel speed of the atomiser, i.e. the relative speed of the atomiser relative to the component surface to be coated.

It should also be mentioned that, in the preferred exemplary embodiment, the painting robot is arranged in a fixed location and therefore typically has six movable robot axes.

However, it is also possible in principle that the painting robot is movable along a rail in the conveying direction and thus has an additional seventh axis.

It has previously been mentioned that the conveyor is able to convey the component in stop-start operation. In the process, the component is preferably painted when the component is stationary, i.e. when the conveyor interrupts its conveying operation.

However, it is also possible that the conveyor conveys the component through the painting installation continuously, such that during painting, the painting robot must follow the conveying movement of the conveyor, which requires synchronisation of the conveying movement of the conveyor with the painting movement of the painting robot, which is also known in the prior art and therefore need not be described in detail.

Furthermore, it has already been mentioned that the painting robot has a particular spatial range within which it is able to paint the component. During the painting process, the painting robot can also begins with the painting of a particular painting module only when the conveyor has positioned the component along the conveying direction such that the painting module is fully within the range of the painting robot. This is advantageous because the painting robot can also finish painting the respective painting module when the conveyor suddenly stops, for example during an emergency stop. In this context, it should be mentioned that the entire bodywork can also constitute one painting module.

With regard to the course of the painting path within the painting module, different possibilities exist. In an example, the path sections lying below the component edge extend as far as the turning points exclusively transversely to the component edge, i.e. preferably in the vertical direction. By contrast, the path sections extending above the component edge preferably extend as far as the turning points, exclusively parallel to the component edge, i.e. in the conveying direction or in the horizontal direction. It should also be mentioned that the painting path within the painting module is preferably interruption-free so that the atomiser can paint the complete painting module in one pass without interruption or cessation. In one exemplary embodiment, it is also provided that the path section extending along the component edge extends over the entire length of the component edge within the painting module. This is advantageous because the portion of the component edge can then be painted in one pass, which contributes to optimising the painting result.

It should also be mentioned that, in the painting method, the path section extending transversely to the component edge preferably lies within the painting module, i.e., spaced apart from the turning points of the painting path.

It should further be mentioned that, in the painting method, the turning points of the painting path can lie exclusively at the opposite side edges of the painting module.

Alternatively, the possibility exists that the turning points of the painting path lie partially on the component edge and partially at a lower edge of the painting module or at a side edge of the painting module.

Apart from the above-described painting method, the present disclosure also encompasses a corresponding painting installation which carries out the painting method. The painting installation therefore has a modified robot control system or a conventional robot control system with a modified control program, wherein the robot control system carries out the above-described painting method.

DRAWINGS

Figure 3:
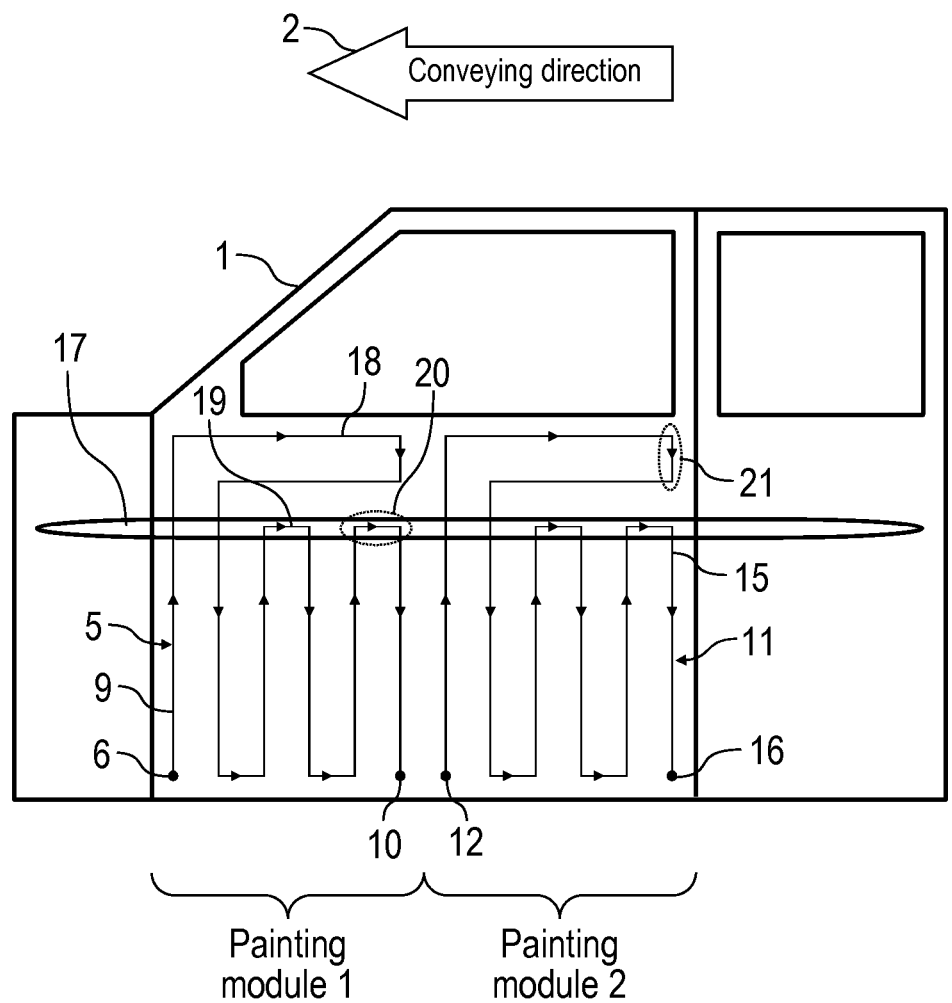
Figure 4:
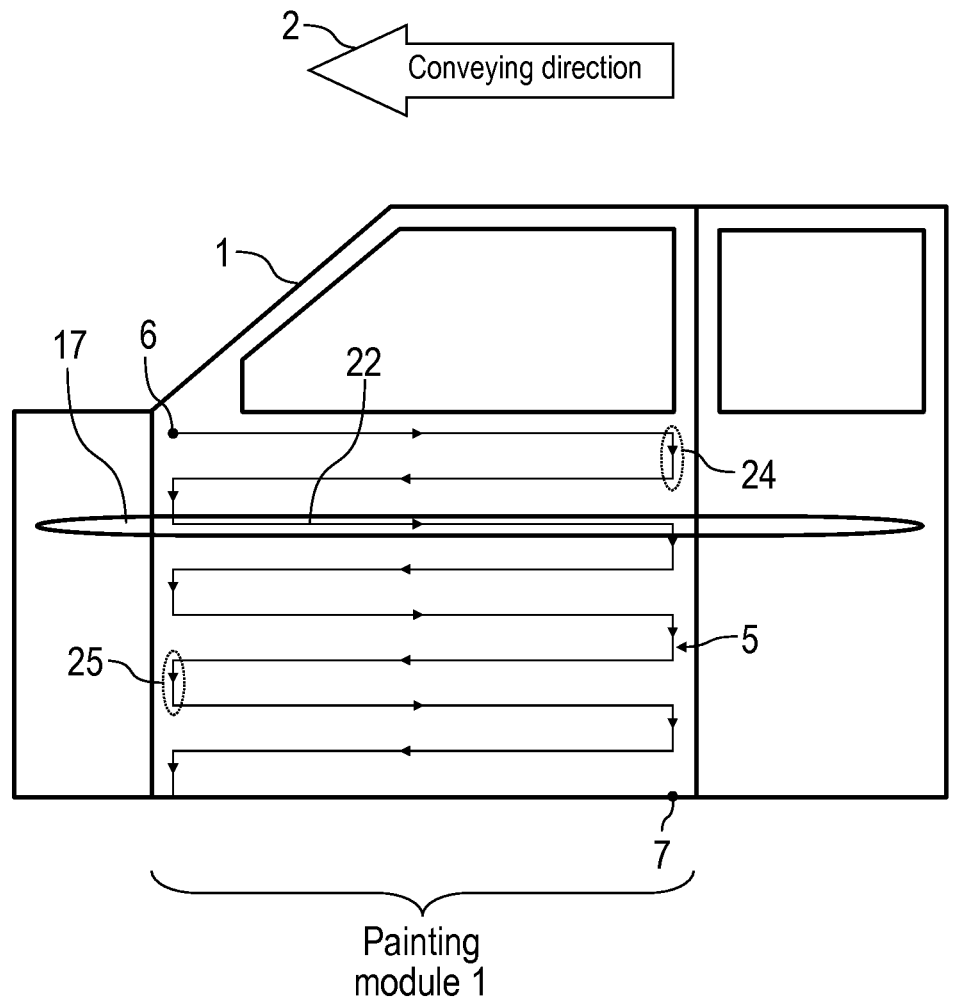
Figure 5:
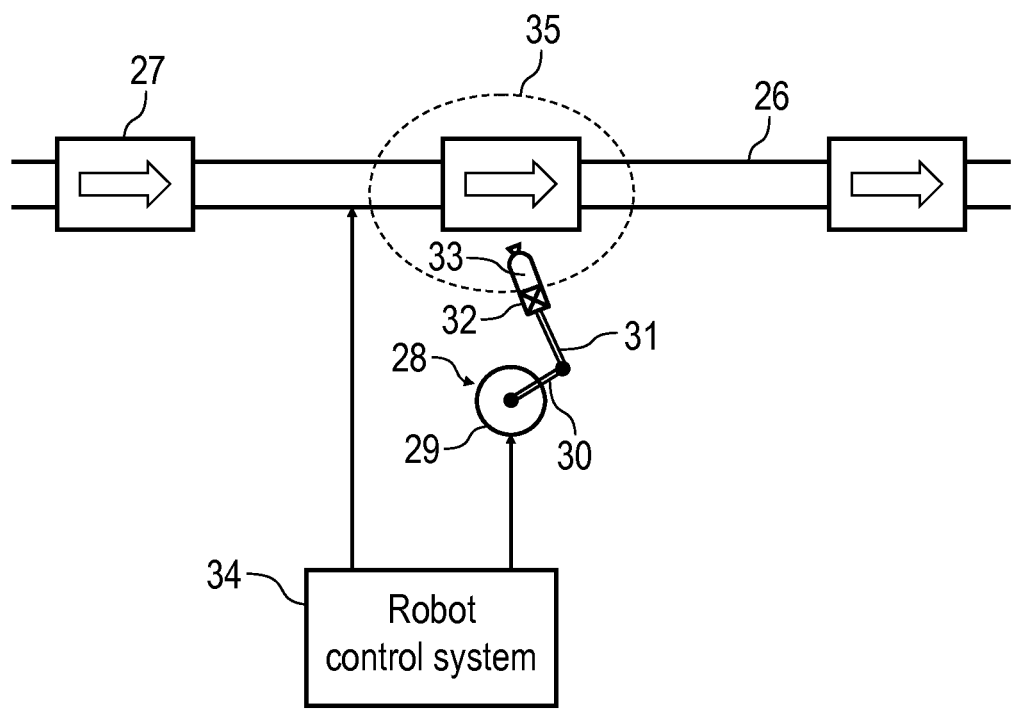
Figure 6:
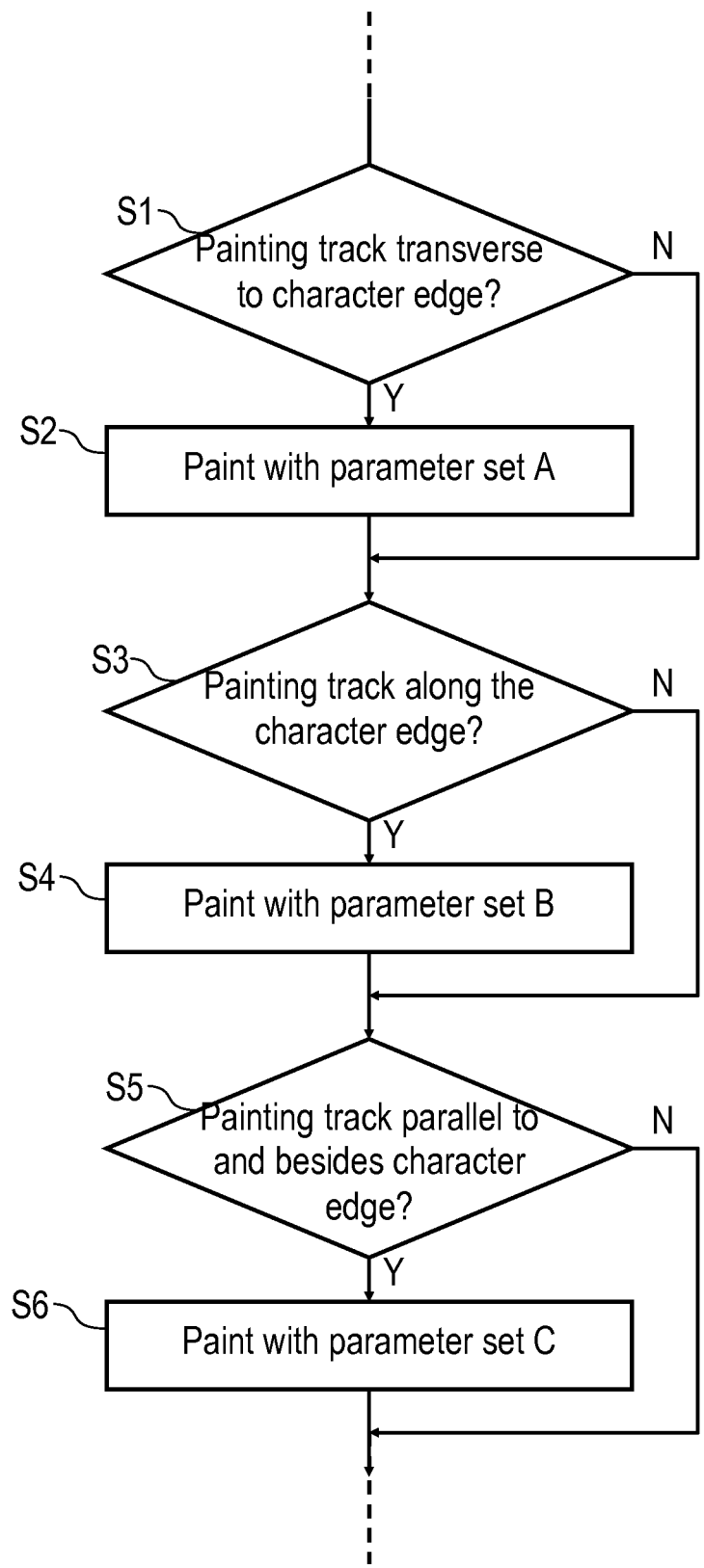

Other modifications of are disclosed in the subclaims or are described below in greater detail together with the description of the preferred exemplary embodiments. In the drawings:

FIG. 1 shows a conventional pattern of a painting path during painting of a door section of a motor vehicle bodywork, FIG. 2 shows the division of the door section into painting modules with the conventional painting method of FIG. 1, FIG. 3 shows a pattern of the painting path during painting of a door region of a motor vehicle bodywork with a character edge, FIG. 4 shows a modification of FIG. 3, FIG. 5 shows a schematic simplified representation of a painting installation, and FIG. 6 shows a flow diagram to illustrate the adaptation of the painting parameters during painting along the painting path.

DESCRIPTION

FIG. 3 shows a modification of a conventional painting method, as shown in FIGS. 1 and 2. For the avoidance of repetition, reference is therefore made to the above description relating to FIGS. 1 and 2 wherein the same reference signs are used for corresponding details.

The painting method differs from the conventional painting method in that the painting paths 5, 11 have path sections 18, 19 which extend parallel to the character edge 17. The path sections 19 extend exactly along the character edge 17, whilst the path sections 18 extend parallel and adjacent to the character edge 17.

A further peculiarity of this painting method according to the invention lies therein that the painting paths 5, 11 have turning points 20 which lie precisely on the character edge 17.

A yet further peculiarity lies therein that the painting paths 5, 11 have turning points 21 which lie above the character edge 17 on a side edge of the painting module 3 or 4.

It should also be noted that the path sections 12 of the painting paths 5, 11 extend under the character line 17 exclusively transversely to the character edge 17, whereas the path sections 18 above the character edge 17 extend exclusively parallel to the character edge 17.

FIG. 4 shows a modification of the painting method according in accordance with FIG. 3, so that, for the avoidance of repetition, reference is made to the above description, wherein the same reference signs are used for corresponding details.

A peculiarity of this exemplary embodiment lies therein that the painting path 5 has a path section 22 which extends within the painting module over the entire length of the character edge 17. The character edge 17 is thus painted within the painting module in one pass without interruption and turning points, which contributes to the optimisation of the painting result.

Located within the painting module are exclusively path sections 23 which extend parallel to the character edge 17. The painting path herein has exclusively turning points 24, 25 which lie at the side edges of the painting module.

FIG. 5 shows a painting installation which is suitable for carrying out the painting method. The painting installation largely corresponds to conventional painting installations for painting motor vehicle bodywork components, so that the painting installation is described only briefly below.

Thus, the painting installation has a conveyor 26 which conveys motor vehicle bodywork components 27 through the painting installation in the direction of the arrow.

Furthermore, the painting installation comprises at least one painting robot 28 which can be configured in the conventional manner. Thus, the locally fixed painting robot 28 has a rotatable robot base 29, two robot arms 30, 31, a robot hand axis 32 and a rotary atomiser 33.

The conveyor 26 and the painting robot 28 are controlled by a robot control system 34, wherein the robot control system 34 contains a modified control program which carries out the painting method described above.

It is also apparent from the drawing that the painting robot 28 has a limited range 35 which is schematically shown. The painting robot 28 is thus able to paint within the range 35. The painting robot 28 begins with the painting of a painting module only when the painting module is located fully within the range 35.

Finally, FIG. 6 shows a flow diagram to illustrate the dynamic adaptation of the operating parameters of the painting robot 28 and/or of the rotary atomiser 33 during the painting process.

In a step S1, it is tested whether the current path section of the painting path extends transversely to the character edge 17. If this is the case, then in a step S2, a parameter set A ("brush") is set which defines, for example, the rotational speed of the rotary atomiser 33, the paint flow, the shaping air flow, the high voltage potential of the electrostatic high voltage charge or other parameters.

Otherwise, in a step S3, it is tested whether the painting path currently extends along the character edge 17.

If this is the case, then in step S4, an adjusted parameter set B is set which is optimally adjusted to the painting along the character edge 17.

Otherwise, in a step S5, it is tested whether the painting path currently extends parallel to and besides the character edge 17. If this is the case, then in step S6, an optimised parameter set C is set.

The invention is not restricted to the above-described preferred exemplary embodiments. Rather, a plurality of variants and modifications is possible which also make use of the inventive concept and therefore fall within the scope of protection. In particular, the invention also claims protection for the subject matter and the features of the sub-claims separately from the claims to which they refer, so that the invention also claims protection for a sub-combination of the features of the main claim.

The invention claimed is:

1. A method for painting a surface of a vehicle body component in a painting installation, the component including a character edge spanning the surface, the method comprising:
   conveying the component along a conveying direction through the painting installation, the component being aligned with the character edge along the conveying direction;
   subdividing the surface of the component into areal painting modules, each of the painting modules including an upper edge and a lower edge, the character edge being spaced apart from each upper edge and lower edge, wherein the painting modules are respectively arranged in series along the conveying direction and the painting modules overlap the character edge;
   painting each of the painting modules of the surface one after the other with a multi-axis painting robot having an atomiser;
   wherein the painting robot guides the atomiser within each painting module along a painting path,
   the painting path having a transverse path section that extends transversely to the character edge,
   a first parallel path section which extends substantially parallel to and overlaying the character edge in the conveying direction, and a second parallel path section which extends substantially opposite the conveying direction.

2. The method of claim 1, wherein
   the character edge extends substantially horizontally and substantially parallel to the conveying direction; and
   the painting path crosses the character edge within the respective painting module less than four times.

3. The method of claim 1, wherein at least one of the first parallel path section and the second parallel path section extends along the character edge so that the atomiser paints the component surface along the character edge.

4. The method of claim 1, further comprising:
   operating the atomiser and the painting robot along at least one of the first parallel path section and the second parallel path section with a parameter set different than is used during painting on the transverse path section.

5. The method of claim 4, wherein the parameter set includes at least one of the following operating parameters of the atomiser and of the painting robot:
   a rotational speed of the atomiser,
   a shaping air flow for forming a spray jet emitted by the atomiser,
   a paint flow,
   a high voltage potential of an electrostatic paint charge, and
   a travel speed of the atomiser.

6. The method of claim 1, wherein the painting robot is arranged to be stationary.

7. The method of claim 1, wherein the component is conveyed through the painting installation in a stop-start operation.

8. The method of claim 7, wherein the painting robot paints the component while the component is stationary.

9. The method of claim 1, wherein
   the painting robot has a particular spatial range within which it is able to paint the component; and
   the painting robot begins painting of one of the painting modules only when the painting module is fully within range of the painting robot.

10. The method of claim 1, wherein
    portions of the painting path lying below the component edge extend as far as turning points exclusively transversely to the component edge;
    portions of the painting path lying above the component edge extend as far as turning points exclusively parallel to the component edge;
    the painting path is interruption-free within the respective painting module, so that the atomiser paints the complete painting module in one pass without interruption.

11. The method of claim 3, wherein
    the at least one of the first parallel path section and the second parallel path section path extending along the component edge extends substantially entirely over component edge within the respective painting module.

12. The method of claim 1, wherein
    the painting path has turning points at which movement of the atomiser is reversed where the transverse path sections lie exclusively within the turning points; and
    the turning points of the painting path lie exclusively at opposing edges of the respective painting module.

13. The method of claim 1, wherein
    the painting path has turning points at which movement of the atomiser is reversed;
    a plurality of the turning points lies on the component edge;
    at least one of the turning points lies on a lower edge of the respective painting module; and
    at least one of the turning points lies on a side edge of the respective painting module.

14. The method of claim 1, wherein the painting robot has six movable axes, including:
    a rotatable robot base;
    a pivotable proximal robot arm;
    a pivotable distal robot arm; and
    a robot hand axis which guides the atomiser and has three movable axes.

15. The method of claim 3, further comprising:
    operating the atomiser and the painting robot along the at least one of the first parallel path section and the second parallel path section extending along the character edge with a parameter set different than used during painting outside of the character edge.

* * * * *

UNITED STATES PATENT AND TRADEMARK OFFICE
CERTIFICATE OF CORRECTION

PATENT NO.       : 10,046,361 B2
APPLICATION NO.  : 14/785016
DATED            : August 14, 2018
INVENTOR(S)      : Udo Wolf Page 1 of 1

It is certified that error appears in the above-identified patent and that said Letters Patent is hereby corrected as shown below:

In the Claims

Column 8, in Line 18, replace "painting of one of the painting" with -- painting one of the painting --.

Signed and Sealed this
Sixteenth Day of October, 2018

Andrei Iancu
*Director of the United States Patent and Trademark Office*